3,046,318
ALKYLATION PROCESS

George W. Ayers, Chicago, and William A. Krewer, Arlington Heights, Ill., assignors to The Pure Oil Company, Chicago, Ill., a corporation of Ohio
No Drawing. Filed Feb. 29, 1960, Ser. No. 11,491
5 Claims. (Cl. 260—683.63)

This invention relates to an improved process for producing alkylate hydrocarbons and more particularly to a process for the preparation of alkylate hydrocarbons containing a small amount of tertiary butyl acetate. The in situ production of tertiary butyl acetate during alkylation using sulfuric acid catalyst is accomplished by conducting the alkylation reaction in the presence of a sufficient amount of acetic acid to react therewith and form tertiary butyl acetate.

The alkylation reaction wherein paraffinic hydrocarbons are combined directly with olefinic hydrocarbons to produce motor fuels having constituents of a saturated character is well known. In the sulfuric acid alkylation process, a charge comprising one or more isoparaffinic hydrocarbons and one or more olefinic hydrocarbons, including isobutylene, is contacted with sulfuic acid of high concentration, at temperatures of 10° to 80° F. and at pressures up to 300 pounds per square inch for example, to produce a saturated alkylate product. To prevent polymerization of the olefins, it is generally necessary to maintain a relatively low concentration of olefinic reactant in the charge. The temperature used is limited by dealkylation and/or degradation of the hydrocarbon product to low-molecular-weight hydrocarbons, and by the occurrence of side reactions, including polymerization of the olefinic reactant.

This invention finds particular application to the process as applied at temperatures of the order of 10° to 80° F. and at pressures up to 300 pounds per square inch, wherein a catalyst such as sulfuric acid is used. This type of process avoids extensive degradation of the reactants, the occurrence of side reactions and appreciable polymerization of the olefinic reactants. Also, the invention has particular application to those alkylation processes wherein isoparaffinic hydrocarbons are reacted with olefinic hydrocarbons in the presence of sulfuric acid. In these alkylation reactions, the hydrocarbon reactants form with the alkylation catalyst a heterogeneous system during alkylation. The catalytic activity of the alkylation catalyst under these conditions appears to be predicated upon intimate contact between the catalyst and the hydrocarbons. Consequently, the catalyst is used in an amount varying between 10% and 200% by weight, based on the weight of charge.

A feature of this invention is the discovery that the foregoing sulfuric acid alkylation process can be conducted in the presence of a small amount, or a substantial amount, of acetic acid to form during the reaction sufficient tertiary butyl acetate in the end product to be an effective octane booster. Moreover, we have found that tertiary butyl acetate is not so formed under alkylating conditions with hydrofluoric acid as the alkylation catalyst.

It becomes, therefore, a primary object of this invention to provide an improved process for the preparation of alkylate products.

Another object of this invention is to provide a process for the in situ production of tertiary butyl acetate during the alkylation of isoparaffinic hydrocarbons with isobutylene by conducting the alkylation in the presence of acetic acid.

Still a further object of this invention is to provide a process for the production of improved alkylate products containing a "built-in" octane booster.

It is known that tertiary butyl acetate, even when used in very small quantities, enhances the octane rating of leaded, high-octane gasolines. (U.S. Patent 2,210,942, Oil & Gas. Jour., May 18, 1959, vol. 57, No. 21, p. 309.) It is also known that tertiary butyl acetate can be produced by reacting isobutylene with acetic acid in the presence of sulfuric acid as a catalyst, and that tertiary butyl acetate in the presence of a large excess of concentrated sulfuric acid undergoes slow decomposition. Now, in accordance with this invention, we have discovered that a mixture of alkylate and tertiary butyl acetate can be prepared in an inexpensive, facile manner by merely adding acetic acid (or acetic anhydride where water is present) to the feedstock charged to a conventional isobutane-isobutylene, sulfuric acid alkylation unit operated under conventional alkylating conditions, or to the alkylation acid used in the aforesaid unit.

We have found that the concentration of tertiary butyl acetate in the alkylate product is related to the concentration of acetic acid in the sulfuric acid alkylation catalyst at the time of contact. Only a portion of the acetic acid present in the alkylation acid is converted to the acetate in each pass through the reactor, the unconverted acetic acid is merely recycled along with the alkylation acid. Consequently, the desired acetate concentration can be achieved in the product by continuously adding acetic acid to the alkylation acid as it returns to the reaction vessel.

Conventionally, the sulfuric acid concentration must be maintained above about 88% by weight to achieve satisfactory alkylation; therefore, in accordance with this invention, it is preferred to maintain the acetic acid concentration so that this condition is maintained. However, the acetic acid concentration may be as great as 20% by weight in the circulating alkylation acid without serious deleterious effect. In starting the operation of the instant process, it is desirable to use acetic anhydride to react with any water present, and then to use acetic acid. In established operation, acetic acid is used, except that sufficient acetic anhydride may be added to react with the small amounts of water frequently present in acetic acid, and thereby prevent dilution of the alkylation acid. As a general rule, it is preferred to use acetic anhydride only to the extent necessary to react with any water in the acetic acid, the alkylation acid, or other part of the reaction system. Because the recirculating alkylation acid may contain small amounts of tertiary butyl acetate, its temperature should not rise above about alkylation temperature to avoid decomposition of the acetate.

The invention is demonstrated by the following experimental examples:

*Example 1.*—To 300 g. of 96.6% w. sulfuric acid was added 36 g. of acetic anhydride, producing a modified alkylation catalyst consisting of 86.3% w. sulfuric acid, 12.5% w. acetic acid, and 1.2% w. water. A mixture of 7 parts by volume of isobutane and 1 part by volume of isobutylene was passed into this modified alkylation catalyst, using a sintered glass disperser, while maintaining the acid at 32° F. and stirring it mechanically. The neutral alkylate product obtained by separating the hydrocarbon phase from the acid phase of the reaction mixture, and washing with water until free of acid, contained 0.5% w. of tertiary butyl acetate.

A duplicate experiment under the same conditions again yielded an alkylate product containing 0.5% w. of tertiary butyl acetate.

*Example 2.*—To 300 g. of 96.6% w. sulfuric acid was added 12 g. of acetic anhydride, producing a modified alkylation catalyst consisting of 92.9% w. sulfuric acid, 4.5% w. acetic acid, and 2.6% w. water. A mixture of 7 parts by volume of isobutane and one part by volume of isobutylene was passed into this modified alkylation catalyst using a sintered glass disperser, while maintaining the acid at a temperature of 32° F. and stirring it mechanically. The alkylate product was separated from the acid and was washed with water until free of acid. The resulting neutral product contained 0.1% w. of t-butyl acetate.

This experiment was duplicated, again obtaining an alkylate product which contained 0.1% w. of t-butyl acetate.

*Example 3.*—A mixture of 6.2 parts by volume of isobutane and 1 part by volume of isobutylene was passed into a solution of 2.8 grams of glacial acetic acid in 28 grams of liquid hydrofluoric acid for two hours at approximately 32° F. After the alkylate product had been freed of hydrofluoric acid by volatilization of the latter material, it was poured on ice and washed repeatedly with water until the water washings no longer contained acetic acid. The alkylate was then refluxed with a large excess of 0.5 N alcoholic potassium hydroxide to saponify any tertiary butyl acetate that might be present and convert it into tertiary butyl alcohol and the water-soluble potassium acetate. After dilution with an equal volume of water, the mixture was allowed to separate into two layers. The dilute alcoholic alkaline layer was separated, washed several times with half-its-volume portions of hexane, and finally boiled, with occasional water addition, until essentially all of the alcohol had been removed. The aqueous alkaline layer was then found by analysis to contain no acetate. Since tertiary butyl acetate had previously been shown to be readily soluble in liquid hydrocarbons but essentially insoluble in water, and to undergo no detectable hydrolysis during water-contacting and overnight storage over water, it was concluded that tertiary butyl acetate was not formed during the alkylation of isobutylene with isobutane in the presence of liquid hydrofluoric acid catalyst containing acetic acid. Further experiments showed that (1) tertiary butyl acetate decomposes rapidly in contact with liquid hydrofluoric acid and (2) tertiary butyl acetate is not obtained when isobutylene is passed into a mixture of 50 grams of glacial acetic acid and 5 grams of liquid hydrofluoric acid at 32° F., only hydrocarbon polymers being formed, along with traces of organic fluoride.

The results of these experiments are unexpected since it is known that concentrated sulfuric acid brings about slow decomposition of t-butyl acetate at ambient temperatures. By conducting the process on a continuous basis, which is the normal procedure for hydrocarbon alkylation, the process of this invention produces an end product which contains about 0.1 to 0.5% by wt. of tertiary butyl acetate. The process is applicable to the alkylation of isobutylene with a wide variety of isoparaffinic hydrocarbons including, but not limited to, isobutane, isopentane, isohexanes and isoheptanes. The process may be applied to isobutylene, diisobutylene, and/or their mixtures, or to isobutylene and/or diisobutylene admixed with other olefins such as 1-butene, 2-butene, the pentenes, the heptenes, octenes other than diisobutylene, the nonenes and decenes. Temperatures in the range of 10° to 80° F. and pressures up to 300 pounds per square inch may be used in this process. The catalyst for the process is sulfuric acid containing up to 20% by weight of acetic acid, and not more than 6% by weight, and preferably under 3% by weight, of water; the recirculated catalyst may also contain tertiary butyl acetate and other soluble organic bodies formed during previous contacting with the hydrocarbon charge materials. Traces of inorganic salts may also be present in the recirculated catalyst.

The alkylate product resulting from the application of this invention must be washed thoroughly with water to remove any acetic acid present. The water washings may be distilled to recover the acetic acid or they may be neutralized with alkali or lime, concentrated to a small volume and acidified with sulfuric acid or spent alkylation catalyst, and the acetic acid removed by distillation for further use in the application of the process.

Acetic acid remaining in the spent alkylation catalyst may be recovered by distillation, after which the denuded alkylation catalyst is regenerated in the usual manner. The acetic acid obtained as distillate may be used again in the process, either as part of the charge or as part of the fresh make-up alkylation catalyst.

The invention has been demonstrated by several examples which are not to be considered as limitations thereon. The process of this invention is applicable to the alkylation of olefins containing up to 9 carbon atoms per molecule with paraffins containing up to 10 carbon atoms per molecule in the presence of sulfuric acid of sufficient concentration to promote the reaction and using operable amounts of acetic acid, however derived, to produce an alkylate product containing sufficient amounts of tertiary butyl acetate to enhance the octane properties thereof. For minimum commercial efficiency the process should be conducted using a sulfuric acid concentration of at least about 70% and preferably above 70%, which means that as high as 30% of acetic acid may be used.

The alkylate product may be used per se as a motor fuel or blended with any of the known motor fuel hydrocarbons, other alkylates or blends of gasoline components from one or more of the following processes: straight distillation of crude oil, catalytic cracking, thermal cracking, isomerization, polymerization, reforming, hydrogenation and dehydrogenation. An example is a blend of 50% by volume of gasoline from a fluid catalytic cracking process and 50% by volume of an alkylate containing tertiary butyl acetate prepared by the process of this invention. In order to prepare a typical commercial gasoline, there may be added to the alkylate per se or to a blend containing same, between about 0.5 to 5.0 ml./gallon of commercial tetraethyl lead fluid. As is known, commercial tetraethyl lead fluid contains about 61.48 wt. percent tetraethyl lead, about 17.86 wt. percent ethylene dibromide, 18.81 wt. percent ethylene dichloride and about 1.85 wt. percent kerosene, dye, and impurities. Various oxidation inhibitors, metal deactivators, corrosion inhibitors and induction system deposit inhibitors may be incorporated in compositions including the alkylates of this invention. Thus about 1 to 10 lb./1000 bbl. of an oxidation inhibitor, e.g., alkyl phenylene diamines, and alkyl aminophenols, such as N-n-butyl-para-aminophenol; 0.25 to 0.5 lb./1000 bbl. of a metal deactivator, e.g., salicylidene propane diamines, such as N,N'-disalicylidene-1,2-propanediamine; 0.05 to 0.5 lb./1000 bbl. of a corrosion inhibitor, e.g., tertiary amine salts of carboxylic acids, such as the imidazoline salt of polymerized linoleic acid in an aliphatic hydrocarbon solvent; 5 to 50 lb./1000 bbl. of an antiwear agent, e.g., esters of aromatic carboxylic acids, such a dibutyl phthalate, and 1% of an anti-icer, which is optional for winter performance, e.g., lower alcohols or mixtures of alcohols and ethers, such as isopropanol, isopropanol-methanol mixtures, or isopropanol-isopropyl ether mixtures, may be used. The alkylate product of this invention may be incorporated with any or all of the additives, blends and mixtures aforementioned or the alkylate may be blended with a gasoline not containing the aforesaid additives.

A feature of the process is that it can be conducted on a continuous basis and a sufficient amount of acetic anhydride added intermittently or continuously (in small amounts) to react with any water present to form acetic acid therefrom. Another feature of the process is that the alkylate product and alkylation catalyst can be separated and the alkylation catalyst, with or without the addition of additional acetic acid or acetic anhydride, can be recycled while being maintained at alkylation temperature to avoid decomposition of the tertiary butyl acetate therein. This preserves the small but sufficient quantity of tertiary butyl acetate formed in the process and assures an even distribution of the tertiary butyl acetate in the final products.

The embodiments of the invention in which an exclusive property or privilege is claimed are defined as follows:

1. The process of continuously alkylating olefinic hydrocarbons of the group consisting of isobutylene and mixtures of isobutylene with other olefinic hydrocarbons having up to 9 carbon atoms per molecule with isoparaffinic hydrocarbons having up to 10 carbon atoms per molecule which comprises, continuously reacting said olefinic and isoparaffinic hydrocarbons with a catalyst consisting of concentrated sulfuric acid, about 4.5 to 20% by weight of acetic acid and no more than about 6% by weight of water in a reaction zone maintained at a temperature of about 10 to 80° F., continuously separating used acid catalyst containing tertiary butyl acetate from said reaction zone, continuously adding a sufficient amount of acetic anhydride to said acid catalyst to react with the water content thereof and maintain same below about 6% by weight, maintaining said acid catalyst at said reaction temperature to prevent decomposition of said tertiary butyl acetate, recycling said acid catalyst to said reaction zone and continuously recovering an alkylated product of enhanced octane number containing about 0.1 to 0.5% by weight of tertiary butyl acetate from said reaction zone.

2. The process in accordance with claim 1 in which said olefin is isobutylene and said isoparaffinic hydrocarbon is isobutane.

3. The process in accordance with claim 1 in which said alkylation reaction is initiated by adding a sufficient amount of said acetic anhydride to the alkylation catalyst in said reaction zone to maintain the water content thereof under about 3% by weight.

4. The process in accordance with claim 1 in which said olefinic hydrocarbon is isobutylene, said isoparaffinic hydrocarbon is isobutane, said acid catalyst is prepared by the addition of about 36 g. of acetic anhydride to about 300 g. of 96.6% by weight of sulfuric acid to form an initial catalyst consisting of about 86.3% by weight sulfuric acid, about 12.5% by weight acetic acid and about 1.2% by weight of water, the continuous addition of acetic anhydride to said acid catalyst after contact with said hydrocarbons and separation therefrom is conducted so as to maintain said water content at about 1.2% by weight, and said alkylate product contains about 0.5% by weight of tertiary butyl acetate.

5. The process in accordance with claim 1 in which said olefinic hydrocarbon is isobutylene, said isoparaffinic hydrocarbon is isobutane, said acid catalyst is prepared by the addition of about 12 g. of acetic anhydride to about 300 g. of 96.6% by weight sulfuric acid to form an initial catalyst consisting of about 92.9% by weight sufuric acid, about 4.5% by weight acetic acid and about 2.6% by weight water, and said alkylate product contains about 0.1% by weight tertiary butyl acetate.

References Cited in the file of this patent

UNITED STATES PATENTS

| | | |
|---|---|---|
| 2,228,662 | Holm | Jan. 14, 1941 |
| 2,286,184 | Bradley et al. | June 16, 1942 |